(12) United States Patent
Kumeno et al.

(10) Patent No.: US 9,721,154 B2
(45) Date of Patent: Aug. 1, 2017

(54) OBJECT DETECTION APPARATUS, OBJECT DETECTION METHOD, AND OBJECT DETECTION SYSTEM

(71) Applicants: NEC Corporation, Tokyo (JP); NATIONAL UNIVERSITY CORPORATION HOKKAIDO UNIVERSITY, Hokkaido (JP)

(72) Inventors: Hiroyuki Kumeno, Tokyo (JP); Yuji Okamoto, Tokyo (JP); Yuichi Murai, Hokkaido (JP); Yoshihiko Oishi, Hokkaido (JP); Yuji Tasaka, Hokkaido (JP)

(73) Assignees: NEC CORPORATION, Tokyo (JP); NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 14/910,349

(22) PCT Filed: Sep. 1, 2014

(86) PCT No.: PCT/JP2014/073593
§ 371 (c)(1),
(2) Date: Feb. 5, 2016

(87) PCT Pub. No.: WO2015/041081
PCT Pub. Date: Mar. 26, 2015

(65) Prior Publication Data
US 2016/0188968 A1 Jun. 30, 2016

(30) Foreign Application Priority Data
Sep. 17, 2013 (JP) .................. 2013-191733

(51) Int. Cl.
*G06K 9/00* (2006.01)
*G06T 7/20* (2017.01)
(Continued)

(52) U.S. Cl.
CPC ..... *G06K 9/00362* (2013.01); *G06K 9/00335* (2013.01); *G06K 9/00624* (2013.01);
(Continued)

(58) Field of Classification Search
CPC .......... G06K 9/00362; G06K 9/00335; G06K 9/00624; G06K 9/42; G06K 9/6212;
(Continued)

(56) References Cited

U.S. PATENT DOCUMENTS 7,702,019 B2   4/2010   Iwasaki et al.
8,542,873 B2   9/2013   Lien
(Continued)

FOREIGN PATENT DOCUMENTS

CN   202476328 U   10/2012
JP   2005-189103   7/2005
(Continued)

OTHER PUBLICATIONS

International Search Report, PCT/JP2014/073593, Dec. 9, 2014.
(Continued)

*Primary Examiner* — Amandeep Saini
(74) *Attorney, Agent, or Firm* — Young & Thompson (57) ABSTRACT

An object detection apparatus is capable of estimating the size of a moving object easily based on images. An object detection apparatus (5) of an object detection system (1) includes an object detection/determination unit (7) configured to analyze a period of motion of the object based on the images to estimate a size of the object based on the period of motion of the object.

12 Claims, 6 Drawing Sheets

(51) Int. Cl.
*G06K 9/42* (2006.01)
*G06K 9/62* (2006.01)

(52) U.S. Cl.
CPC ............ *G06K 9/42* (2013.01); *G06K 9/6212* (2013.01); *G06T 7/20* (2013.01); *G06T 2207/10016* (2013.01); *G06T 2207/30232* (2013.01)

(58) Field of Classification Search
CPC ............ G06T 7/20; G06T 2207/10016; G06T 2207/30232
USPC ........................................................ 382/103
See application file for complete search history.

(56) References Cited

U.S. PATENT DOCUMENTS

| | | |
|---|---|---|
| 2008/0074494 A1 | 3/2008 | Nemethy |
| 2009/0067676 A1 | 3/2009 | Kempf |
| 2010/0069203 A1 | 3/2010 | Kawaguchi et al. |
| 2010/0186284 A1 | 7/2010 | Hyde et al. |
| 2012/0200447 A1 | 8/2012 | Vacanti |
| 2013/0082142 A1 | 4/2013 | Li |

FOREIGN PATENT DOCUMENTS

| | | |
|---|---|---|
| JP | 2010-068968 | 4/2010 |
| JP | 2010088338 | 4/2010 |
| JP | 2010-223752 | 10/2010 |
| JP | 2011-509216 | 3/2011 |
| JP | 2011095112 | 5/2011 |
| TW | 200638192 A | 11/2006 |
| TW | M328784 U | 3/2008 |
| TW | 200821612 A | 5/2008 |
| TW | M382719 U | 6/2010 |
| TW | 201043025 A | 12/2010 |
| WO | WO 2009/102001 | 8/2009 |

OTHER PUBLICATIONS

Written Opinion, PCT/JP2014/073593, Dec. 9, 2014.
Taiwan Office Action dated Nov. 6, 2016; Application No. 103131961.
Canadian Office Action dated Dec. 21, 2016 in corresponding Canadian Patent Application No. 2,920,823.
Extended European Search Report (EESR) dated Apr. 3, 2017; Application No. 14846528.9.
Wen Li et al: Automatic Video-based Bird Species Filtering Using Periodicity of Salient Extremities, Dec. 31, 2012 (Dec. 31, 2012).
E. W. Houghton et al: Use of Bird Activity Modulation Waveforms in Radar Identification, Oct. 13, 1972 (Oct. 13, 1972).
Goldenberg R et al: Behavior classification by eigendecomposition of periodic motions, Pattern Recognition, Elsevier, GB, vol. 38, No. 7, Jul. 1, 2005 (Jul. 1, 2005).
Yuichi Murai et al: Detection of Birds Flying in the Aerodrome by Image Analysis, Sep. 21, 2010, (Sep. 21, 2010).
Zhaofa Zeng et al: "The analysis of TWI data for human being's periodic motions", Geoscience and Remote Sensing Symposium (IGARSS), 2011 IEEE International, IEEE, Jul. 24, 2011 (Jul. 24, 2011), pp. 862-865.

OBJECT DETECTION APPARATUS, OBJECT DETECTION METHOD, AND OBJECT DETECTION SYSTEM

TECHNICAL FIELD

This invention relates to an object detection apparatus, an object detection method, and an object detection system.

BACKGROUND OF THE INVENTION

In recent years, the so-called "bird strike" has been a problem, in which a moving object, such as a bird, intrudes into a territory where an airport, wind power facilities, or the like is constructed, and collides with an aircraft taking off from or landing to the airport, or with a windmill of the wind power facilities.

Accordingly, there has been desired a detection apparatus configured to detect the intrusion of the bird into the territory.

As an apparatus configured to detect the bird, there is known an apparatus configured to use a night-vision apparatus and a sound collection apparatus in combination (Patent Document 1), but with this configuration, an apparatus configured to analyze images and an apparatus configured to analyze sounds need to be separately provided, and hence the configuration is undesirably complicated. Thus, a structure capable of detecting the bird only through image analysis is desired.

As an apparatus configured to detect the bird only through image analysis, there is known a configuration to pick up a flying object at minute time intervals to detect the type and velocity of the bird based on a change in movement amount of a subject (Patent Documents 2 to 5).

PRIOR ART DOCUMENTS

Patent Document
Patent Document 1: JP-A-2005-189103
Patent Document 2: WO2009/102001
Patent Document 3: JP-A-2010-088338
Patent Document 4: JP-A-2010-223752
Patent Document 5: JP-A-2011-95112

SUMMARY OF THE INVENTION

Problem to be Solved by the Invention

Incidentally, from the viewpoint of reduction in damage to an aircraft or a windmill caused by a bird strike, the size of a bird expected to collide with the aircraft or the windmill is a significant concern, and in the detection apparatus, measurement of the size is an extremely important matter.

However, with the bird detection using a surveillance camera as disclosed in Patent Documents 2 to 4, there has been a problem in that it is difficult to find a distance to the detected bird and an actual size of the bird based only on images acquired by a single surveillance camera.

For example, although the size of a bird can be estimated to some degree as long as the type of the bird can be determined, it has been extremely difficult to automatically determine the type of bird based on image information that can be acquired at present. This is because, for example, color information on the bird greatly varies depending on circumstances even for the same type of bird.

Thus, at present, it is difficult to estimate the size of the bird based only on images acquired by the single surveillance camera, and in order to estimate the size, 3D imaging using a plurality of surveillance cameras needs to be performed, which leads to a significant increase in cost.

This invention has been made in order to solve the problem of the above-mentioned technology, and has an object to provide an object detection apparatus capable of estimating a size of the moving object easily based on the images.

Means to Solve the Problem

In order to solve the above-mentioned problem, a first aspect of this invention relates to an object detection apparatus, including an object detection/determination unit configured to analyze a period of motion of a moving object, based on moving images acquired by picking up the moving object using an image pickup apparatus, to estimate a size of the moving object based on the period of motion.

A second aspect of this invention relates to a program for causing a computer to operate as an object detection apparatus, the object detection apparatus including an object detection/determination unit configured to analyze a period of motion of a moving object, based on moving images acquired by picking up the moving object using an image pickup apparatus, to estimate a size of the moving object based on the period of motion.

A third aspect of this invention relates to an object detection method, including detecting a moving object by using an object detection apparatus including an object detection/determination unit configured to analyze a period of motion of the moving object, based on moving images acquired by picking up the moving object using an image pickup. apparatus, to estimate a size of the moving object based on the period of motion.

A fourth aspect of this invention relates to a bird strike prevention apparatus, including the object detection apparatus of the first aspect.

A fifth aspect of this invention relates to an object detection system, including: an image pickup apparatus configured to pick up a moving object to acquire moving images of the moving object; and a detection apparatus including an object detection/determination unit configured to analyze a period of motion of the moving object based on the moving images to estimate a size of the moving object based on the period of motion.

A sixth aspect of this invention relates to an object detection apparatus, including: a period detection unit configured to acquire a flapping frequency of a moving object based on a plurality of moving images acquired by picking up the moving object using an image pickup apparatus; and an object size estimation unit configured to estimate a size of the moving object based on the flapping frequency.

Effect of the Invention

According to one aspect of this invention, the object detection apparatus capable of estimating the size of a moving object easily based on images may be provided.

MODE FOR EMBODYING THE INVENTION

Now, a preferred exemplary embodiment of this invention is described in detail with reference to the drawings.

First, referring to FIGS. 1 and 2, description will be made about a configuration of an object detection system 1 including an object detection apparatus 5 according to this exemplary embodiment.

In the following, a bird strike prevention apparatus configured to detect a bird from an image is described as an example of the object detection system 1 (object detection apparatus 5).

Figure 1:
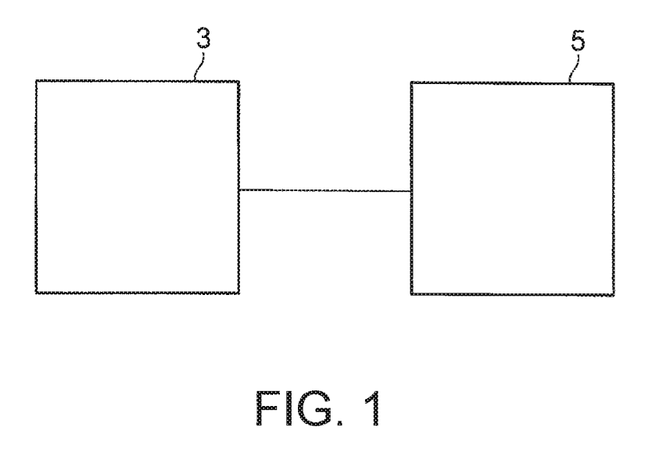
FIG. 1 is a block diagram for illustrating an outline of an object detection system 1 according to an exemplary embodiment of this invention.
Figure 2:
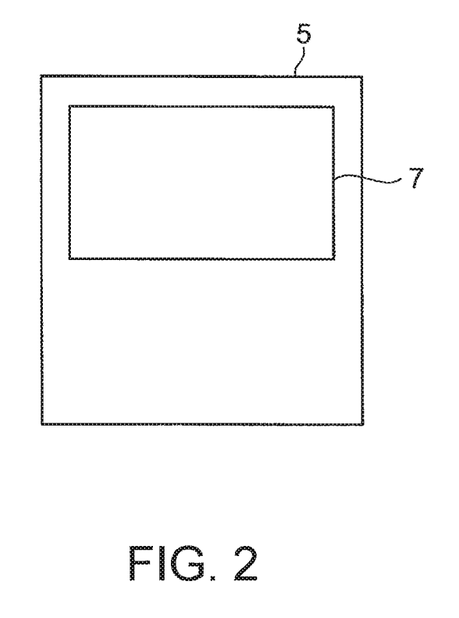
FIG. 2 is a block diagram for illustrating an object detection apparatus 5 of FIG. 1.

As illustrated in FIGS. 1 and 2, the object detection system 1 comprises an image pickup apparatus 3 configured to pick up a moving object, which is a bird in this case, to acquire images of the object, and the object detection apparatus 5 including an object detection/determination unit 7 configured to analyze a period of motion of the object (bird) based on the images to estimate the size of the object based on the period of motion of the object.

In this case, the image pickup apparatus 3 comprises a surveillance camera. The surveillance camera is installed on a fixed base and is configured to pick up images by performing fixed-point surveillance in a fixed direction or by surveillance of a range corresponding to the entire circumference or a fixed range through rotation. Further, the image pickup apparatus 3 transmits the picked-up images to the object detection apparatus 5 in a wired or wireless manner.

In this exemplary embodiment, the object detection apparatus 5 is used in the bird strike prevention apparatus, and hence the image pickup apparatus 3 is installed at an end of a runway of an airport or in a facility of a wind power plant.

The object detection apparatus 5 in this exemplary embodiment has, in addition to a function of estimating the size of a bird based on the images picked up by the image pickup apparatus 3, as described later, a function of estimating a distance from the image pickup apparatus 3 to a bird and a function of estimating a possibility of the detected bird intruding into a zone under intensive surveillance (to be described in detail later).

An electronic computer, such as a personal computer, is used as the object detection apparatus 5, but the object detection apparatus 5 is not particularly limited to a specific apparatus as long as the object detection apparatus 5 is an apparatus having a function of performing processing to be described later.

A significant feature of the object detection system 1 of this exemplary embodiment resides in that the object detection/determination unit 7 of the object detection apparatus 5 estimates the size of a bird based on the period of motion of the object, which is a flapping frequency or vertical movement frequency of the bird within the image in this case.

This is because a periodical motion of a bird, such as the flapping frequency or vertical movement frequency of the bird, is strongly correlated with the size of the bird, and hence the size of a bird may be estimated by measuring the flapping frequency or vertical movement frequency of the bird.

This is also because a periodical motion of a bird, such as the flapping frequency or vertical movement frequency of the bird, may be measured relatively easily from images, and may be measured even with the use of images each containing an object located at a far distance and thus having a small number of pixels or a low-quality image.

In other words, hitherto, in image processing of extracting detection target images from acquired images by shape comparison, both of the acquired images and the detection target images, each needs to be formed of at least several hundreds of pixels. In contrast, in the method according to this exemplary embodiment, bird detection is performed with the use of the flapping frequency, or the vertical movement frequency when flapping is not detected, which is a feature amount whose information is relatively maintained even under an environment of a small number of pixels, and hence a bird flying at a far distance (and hence the number of pixels within the image of the bird is small) may be detected.

Accordingly, in a case of detecting a bird located at the same distance, as compared with the related-art method, only data corresponding to a smaller number of pixels needs to be processed, and hence the system may be configured with the use of an inexpensive image pickup apparatus and computer hardware.

Moreover, the flapping frequency or vertical movement frequency of a bird is the feature amount that can be measured irrespective of color information of each pixel and luminance distribution, and hence this detection method is applicable even under a condition in which image quality is relatively low, such as twilight in the early morning or early evening, cloudy weather, or rainy weather.

Further, bird detection using a radar, which is a commonly-used bird detection method, can only determine whether or not there is an object based on the strength of a radio-wave reflection echo to estimate the size of an object with the use of a radar cross-section (RCS) as a basis. Therefore, in general, with the bird detection using the radar, accurate information on the type and size of a bird cannot be acquired, and it is difficult to perform highly accurate detection when a background is near a sea surface or a ground surface and causes a large number of clutters, or under a strong-wind environment.

In contrast, in this application, a periodical motion of a bird, such as the flapping frequency or vertical movement frequency of the bird, is used, and hence the size of the bird may be estimated accurately.

In addition, a 3D flight trajectory may be measured based on images acquired by a single image pickup apparatus 3, which eliminates the need to provide a plurality of image pickup apparatus 3, and hence reduction in cost and size of the apparatus may be achieved.

Note that, the "flapping frequency" as used herein means a reciprocal of a period in which wings of a bird move and then return to their original positions. More specifically, a period of time from when wings of a bird are located at the same height as a body of the bird until the wings of the bird return from an upper peak to pass through the same height as the body of the bird, move to a lower peak, and return from the lower peak to the same height as the body of the bird again is represented by a period T, and a reciprocal of the period T is defined as the flapping frequency. For example, when a period of time in which the wings of the bird pass through the upper peak, then pass through the lower peak, and return to the same height as the body of the bird again is assumed to be 25 ms, the flapping frequency is 40 Hz.

Moreover, the "vertical movement frequency" as used herein means a reciprocal of a period in which a bird moves in a vertical direction and then returns to its original position. More specifically, a period of time from when a specific position (e.g., the center of gravity) of a bird is located at a predetermined height until the specific position moves vertically to an upper peak, moves vertically to a lower peak, and returns from the lower peak to the predetermined height again is represented by a period T, and a reciprocal of the period T is defined as the vertical movement frequency. For example, when a period of time in which the specific position of the bird passes through the upper peak, then passes through the lower peak, and returns to its original position again is assumed to be 25 ms, the vertical movement frequency is 40 Hz.

Figure 3:
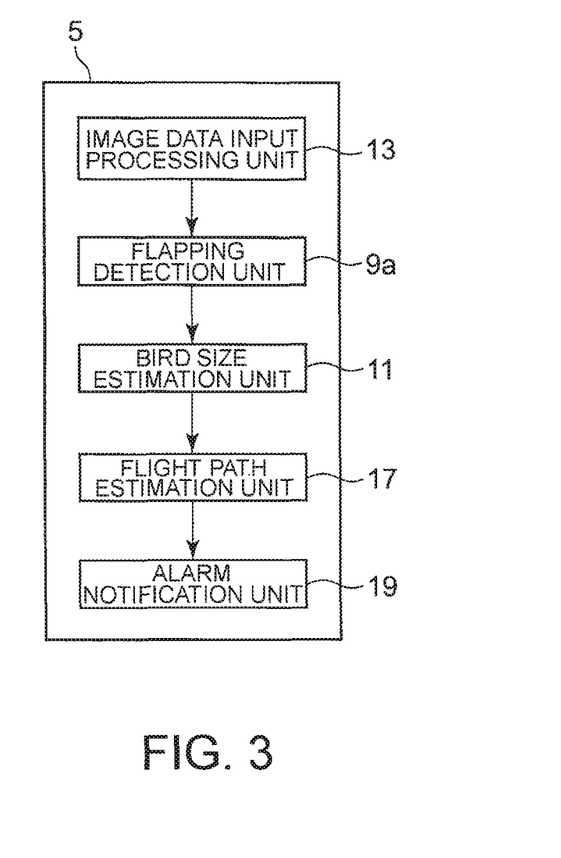
FIG. 3 is a block diagram for illustrating a configuration of the object detection apparatus 5.

Next, referring to FIG. 3, a configuration of the object detection apparatus 5 is described more specifically.

As illustrated in FIG. 3, the object detection apparatus 5 comprises an image data input processing unit 13 configured to input data on images picked up by the image pickup apparatus 3, a flapping detection unit 9a (first period detection unit) configured to detect the flapping frequency of a bird within the images, a bird size estimation unit 11 configured to estimate the size of a bird based on the flapping frequency of the bird, a flight path estimation unit 17 configured to estimate the flight path of the bird based on the size of the bird estimated by the bird size estimation unit 11, and an alarm notification unit 19 configured to issue a warning when there is a possibility that the bird intrudes into the zone under intensive surveillance.

Figure 4:
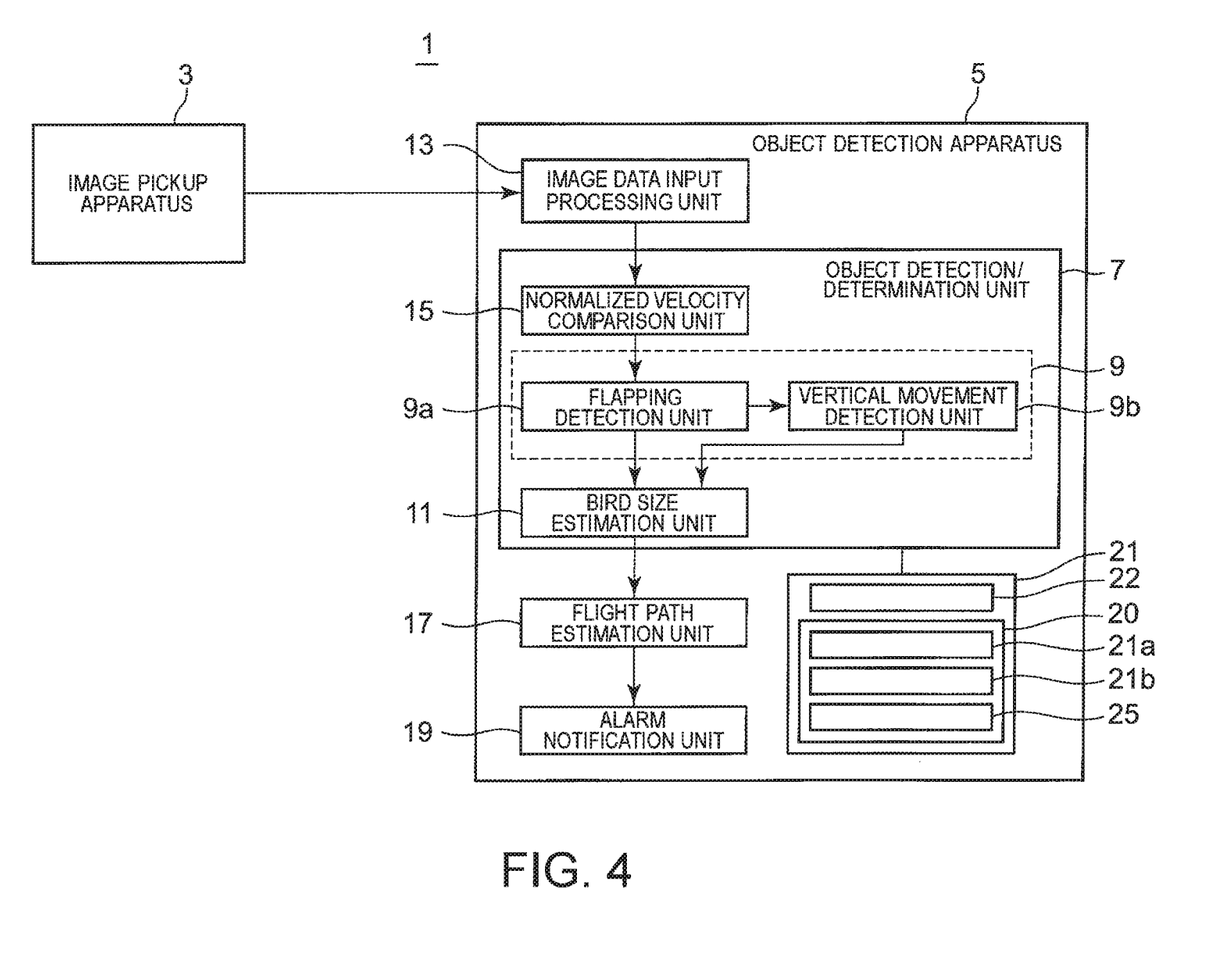
FIG. 4 is a block diagram for illustrating details of the object detection system 1.

Next, referring to FIG. 4, the configuration of the object detection system 1, in particular, the configuration of the object detection apparatus 5, is described in more detail.

As illustrated in FIG. 4, the object detection apparatus 5 comprises the image data input processing unit 13 configured to input the data on the images picked up by the image pickup apparatus 3, the object detection/determination unit 7 configured to determine whether or not a bird exists in the images and determine the size of the bird, the flight path estimation unit 17 configured to estimate the flight path of the bird based on a detection result acquired by the object detection/determination unit 7, and the alarm notification unit 19 configured to issue a warning when there is a possibility that the bird intrudes into the zone under intensive surveillance.

The object detection/determination unit 7 comprises a normalized velocity comparison unit 15 configured to determine whether or not the moving object (bird) is included in the images based on the velocity of the moving object within the images, a period detection unit 9 configured to detect a period of motion of the bird, and the bird size estimation unit 11 configured to estimate the size of the bird based on the period of motion. In this exemplary embodiment, the flapping frequency or vertical movement frequency of a bird is measured as the period of motion of the bird, and hence the period detection unit 9 comprises the flapping detection unit 9a configured to detect the flapping frequency of the bird and a vertical movement detection unit 9b configured to detect the vertical movement frequency of the bird.

The object detection apparatus 5 further comprises a storage unit 21 including a library 20 to be referred to when the bird size estimation unit 11 estimates the size of the bird.

In this exemplary embodiment, the flapping frequency or vertical movement frequency of a bird is measured as the period of motion of the bird, and hence the library 20 at least stores flapping frequency information 21a indicating a relationship between the flapping frequency of a bird and the size of the bird and vertical movement frequency information 21b indicating a relationship between the vertical movement frequency of a bird and the size of the bird. The storage unit 21 also stores an operation program 22 for causing the object detection apparatus 5 to operate and map information 25, which is information on a map of the zone under intensive surveillance.

Note that, although the library 20 and the operation program 22 are stored in the storage unit 21 of the object detection apparatus 5 in FIG. 4, the library 20 and the operation program 22 may be replaced with external information stored in an external storage device, or connected via a network by the World Wide Web (WWW) or like.

Next, referring to FIGS. 3 and 5, an outline of an operation of the object detection apparatus 5 among the components of the object detection system 1 will be described.

Figure 5:
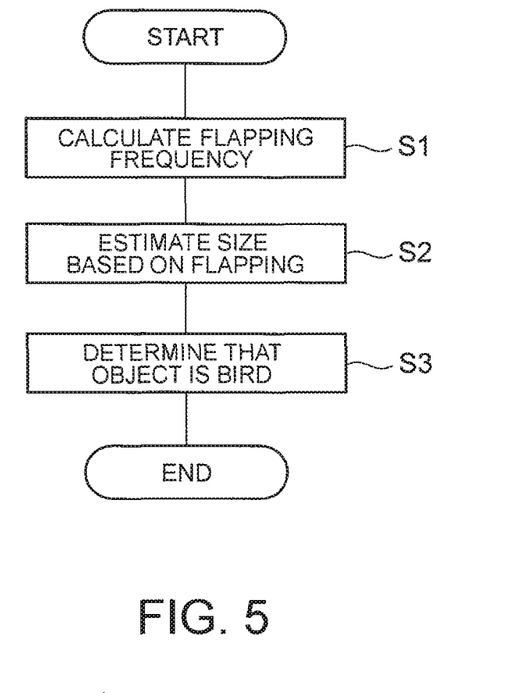
FIG. 5 is a flowchart for illustrating an outline of an operation of the object detection apparatus 5.

First, the flapping detection unit 9a of the object detection apparatus 5 illustrated in FIG. 3 calculates the flapping frequency of a bird on images received from the image data input processing unit 13 (S1 of FIG. 5).

Next, the bird size estimation unit 11 illustrated in FIG. 3 estimates the size of the bird based on the flapping frequency (S2 of FIG. 5), and finally determines whether or not the object on the images is a bird (S3 of FIG. 5).

Note that, when it is determined in Step S3 that the object is a bird, the flight path estimation unit 17 of the object detection apparatus 5 illustrated in FIG. 3 estimates the flight path of the bird, and determines whether or not there is a possibility that the bird intrudes into the zone under intensive surveillance. When it is determined that there is a possibility that the bird intrudes into the zone under intensive surveillance, the alarm notification unit 19 issues a warning to a system configured to surveil the zone under intensive surveillance or a person in charge of surveillance of the zone under intensive surveillance.

Next, referring to FIGS. 4 and 6, an operation of the object detection system 1, which is an operation for preventing a bird strike in this case, will be described in more detail.

First, the operation program 22 of the object detection apparatus 5 is started.

Next, the image pickup apparatus 3 performs fixed-point surveillance in a fixed direction or surveillance of a range corresponding to the entire circumference or a fixed range through rotation to pick up images of the zone under intensive surveillance or a periphery thereof, and transmits the picked-up images to the image data input processing unit 13 of the object detection apparatus 5 (S100 of FIG. 4). The "zone under intensive surveillance" as used herein means a zone in which occurrence of a bird strike needs to be prevented, and examples thereof include a zone in which an airport or wind power facilities are constructed. When the zone under intensive surveillance is an airport, for example, the image pickup apparatus 3 acquires images in respective directions including a direction of a runway to pick up images of the airport and a periphery of the airport.

The image data input processing unit 13 extracts, from the received images, images of a portion assumed to be a moving object by a method such as temporal subtraction. The image data input processing unit 13 further performs, on the extracted moving object, temporary bird determination (primary determination) of comparing the extracted moving object with information on a bird sample, which is recorded in the library 20, in terms of its shape (S101 of FIG. 6).

When determining as a result of the primary determination that a bird is included in the images, in order to allow the object detection/determination unit 7 to perform more detailed determination processing as to whether or not the object is a bird, the image data input processing unit 13 transmits the images to the normalized velocity comparison unit 15 of the object detection/determination unit 7.

Figure 6:
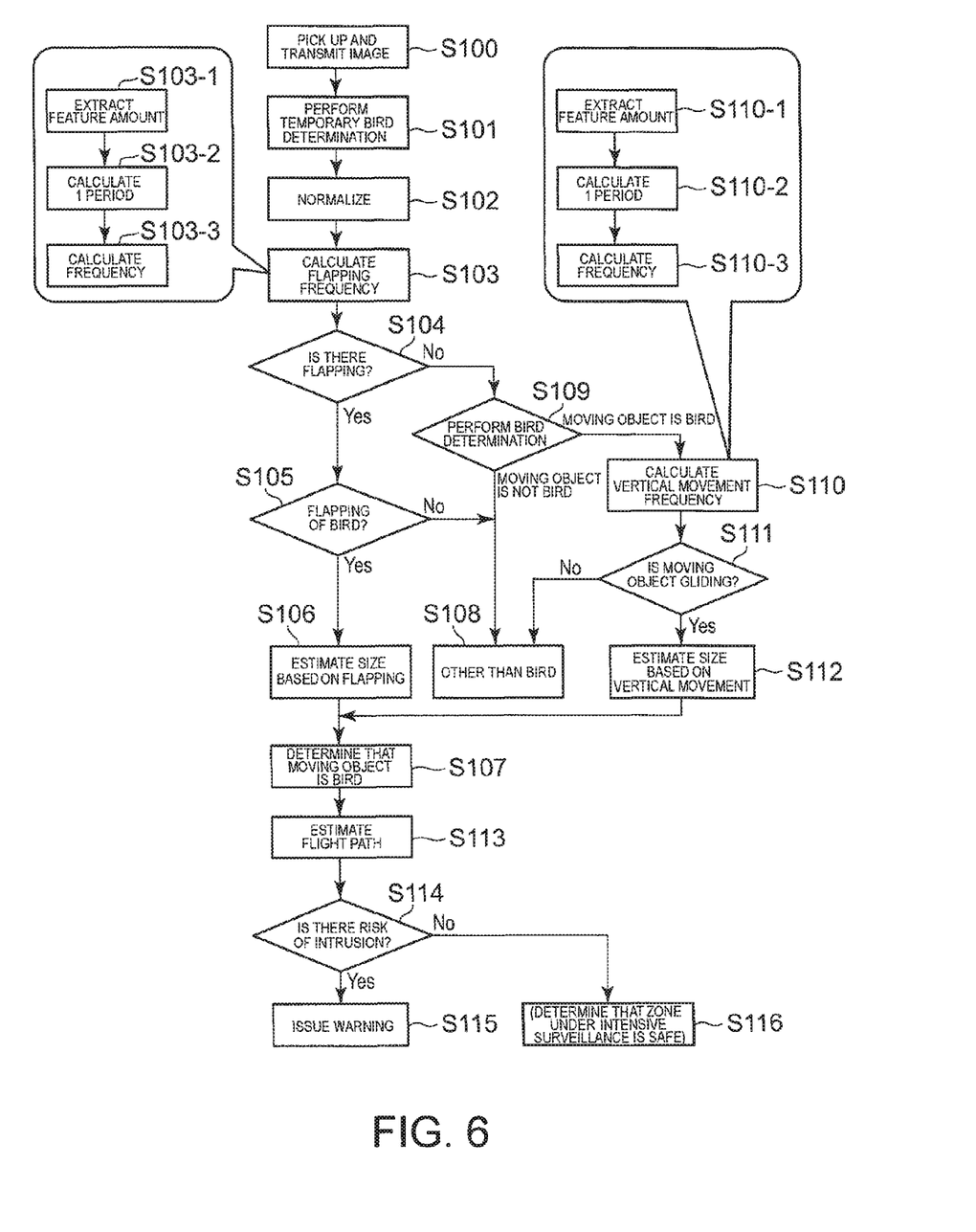
FIG. 6 is a flowchart for illustrating a method of detecting a bird by using the object detection system 1.

When receiving the images (bird candidate data), the normalized velocity comparison unit 15 calculates a value obtained by normalizing a movement velocity of the bird candidate on the images in terms of a length of the bird candidate, and determines whether or not the normalized velocity falls within a range of a flight velocity of a bird, which is recorded in the library 20 (S102 of FIG. 6). In other words, it is determined whether or not the normalized velocity of the object, which is determined as being a bird in the primary determination, on the images falls within the velocity range of the bird (predetermined velocity range), to thereby eliminate erroneous detection of an aircraft, a background image, or the like.

When determining as a result that the normalized velocity falls within the range of the flight velocity of the bird, the normalized velocity comparison unit 15 transmits the images to the flapping detection unit 9a of the period detection unit 9.

When receiving the images, the flapping detection unit 9a calculates the flapping frequency based on the images (S103 of FIG. 6).

A specific method of calculating the flapping frequency is as follows.

First, the flapping detection unit 9a extracts a feature amount based on a change in area or length (or displacement) among a plurality of images (S103-1 of FIG. 6).

Next, the flapping detection unit 9a detects a periodical change of the extracted feature amount, and calculates a period of time until the feature amount returns to its original level (a period of time in which the feature amount becomes the same as a basis feature amount or a period of time in which a difference between the feature amount and the basis feature amount becomes a predetermined value or less) as 1 period (S103-2 of FIG. 6).

Finally, the flapping detection unit 9a determines a period of time until the wings of the bird move and then return to their original positions in the calculated period as the period T, and calculates the flapping frequency based on the calculated period (S103-3 of FIG. 6).

In this case, for example, the feature amount is a maximum value, minimum value, or average value of feature amounts that have been extracted during a specific period of time. Further, the basis feature amount may be defined in advance, or the maximum value or minimum value of the extracted feature amounts may be adopted as the basis.

Next, the flapping detection unit 9a determines whether or not there is flapping based on the flapping frequency (S104 of FIG. 6).

When it is determined in Step S104 that there is flapping, the flapping detection unit 9a determines whether or not the flapping frequency falls within a range of the flapping frequency of a bird, which is recorded in the library 20, that is, determines whether or not the measured flapping is flapping of a bird (S105 of FIG. 6).

When the flapping frequency matches one of values recorded for respective types of birds in the library 20, the flapping detection unit 9a transmits the flapping frequency to the bird size estimation unit 11.

The bird size estimation unit 11 refers to the flapping frequency information 21a to estimate the size of the bird based on the flapping frequency (S106 of FIG. 6), and finally determines that the relevant bird candidate is a bird (S107 of FIG. 6).

Note that, when it is determined that the measured flapping is not flapping of a bird, it is determined that the imaged moving object is not a bird (S108 of FIG. 6).

On the other hand, when it is determined in Step S104 that there is no flapping, bird determination of making detailed shape comparison for each bird type is performed (S109 of FIG. 6).

When it is determined through this processing that the moving object is a bird as a result of the type determination as well, the vertical movement detection unit 9b calculates the vertical movement frequency of the bird (S110 of FIG. 6).

A specific method of calculating the vertical movement frequency is similar to the method of calculating the flapping frequency.

Specifically, first, the vertical movement detection unit 9b extracts the feature amount relating to the vertical movement of the bird based on a change in area or length (or displacement) among a plurality of images (S110-1 of FIG. 6).

Next, the vertical movement detection unit 9b detects a periodical change of the extracted feature amount, and calculates a period of time until the feature amount returns to its original level (a period of time in which the feature amount becomes the same as a basis feature amount or a period of time in which a difference between the feature amount and the basis feature amount becomes a predetermined value or less) as 1 period (S110-2 of FIG. 6).

Finally, the vertical movement detection unit 9b determines a period of time until the bird moves vertically and then returns to its original position in the calculated period as the period T, and calculates the vertical movement frequency based on the calculated period (S110-3 of FIG. 6).

In this case, for example, the feature amount is a maximum value, minimum value, or average value of feature amounts that have been extracted during a specific period of time. Further, the basis feature amount may be defined in advance, or the maximum value or minimum value of the extracted feature amounts may be adopted as the basis.

Note that, when it is determined that the object in motion is not a bird in Step S109, it is determined that the moving object is not a bird (S108 of FIG. 6).

Next, the vertical movement detection unit 9b determines whether or not the relevant images are images of the relevant type of bird that is gliding by comparing the vertical movement frequency of a flight trajectory relating to the relevant type of bird, which is recorded in the library 20, with the vertical movement frequency calculated in Step S110 (S111 of FIG. 6). When it is then determined that the relevant images are images of a gliding bird, the bird size estimation unit 11 refers to the vertical movement frequency information 2 lb to estimate the size of the bird (S112 of FIG. 6), and finally determines the relevant bird candidate as a bird (S107 of FIG. 6).

Note that, when it is determined that the relevant images are not images of a gliding bird, it is determined that the imaged moving object is not a bird (S108 of FIG. 6).

Next, when it is determined in Step S107 that a bird exists within the images, the flight path estimation unit 17 estimates the flight path of the bird (S113 of FIG. 6) to determine whether or not there is a possibility that the bird intrudes into the zone under intensive surveillance (S114 of FIG. 6). When it is determined that there is a possibility that the bird intrudes into the zone under intensive surveillance, the alarm notification unit 19 issues a warning to the system configured to surveil the zone under intensive surveillance or the person in charge of surveillance of the zone under intensive surveillance (S115 of FIG. 6). When it is determined that there is no possibility that the bird intrudes into the zone under intensive surveillance, the flight path estimation unit 17 determines that the zone under intensive surveillance is safe (there is no risk of a bird strike at present) (S116 of FIG. 6).

What is specifically issued as the warning is not particularly limited as long as the warning allows the system or person in charge of surveillance to be warned to recognize the warning, and examples thereof include transmission of warning information to the system or the person in charge of surveillance and emission of a physical sound, light, or the like.

Now, a method of estimating the flight path of a bird and of determining whether or not there is a possibility that the bird intrudes into the zone under intensive surveillance is described in more detail with reference to FIG. 7.

Figure 7:
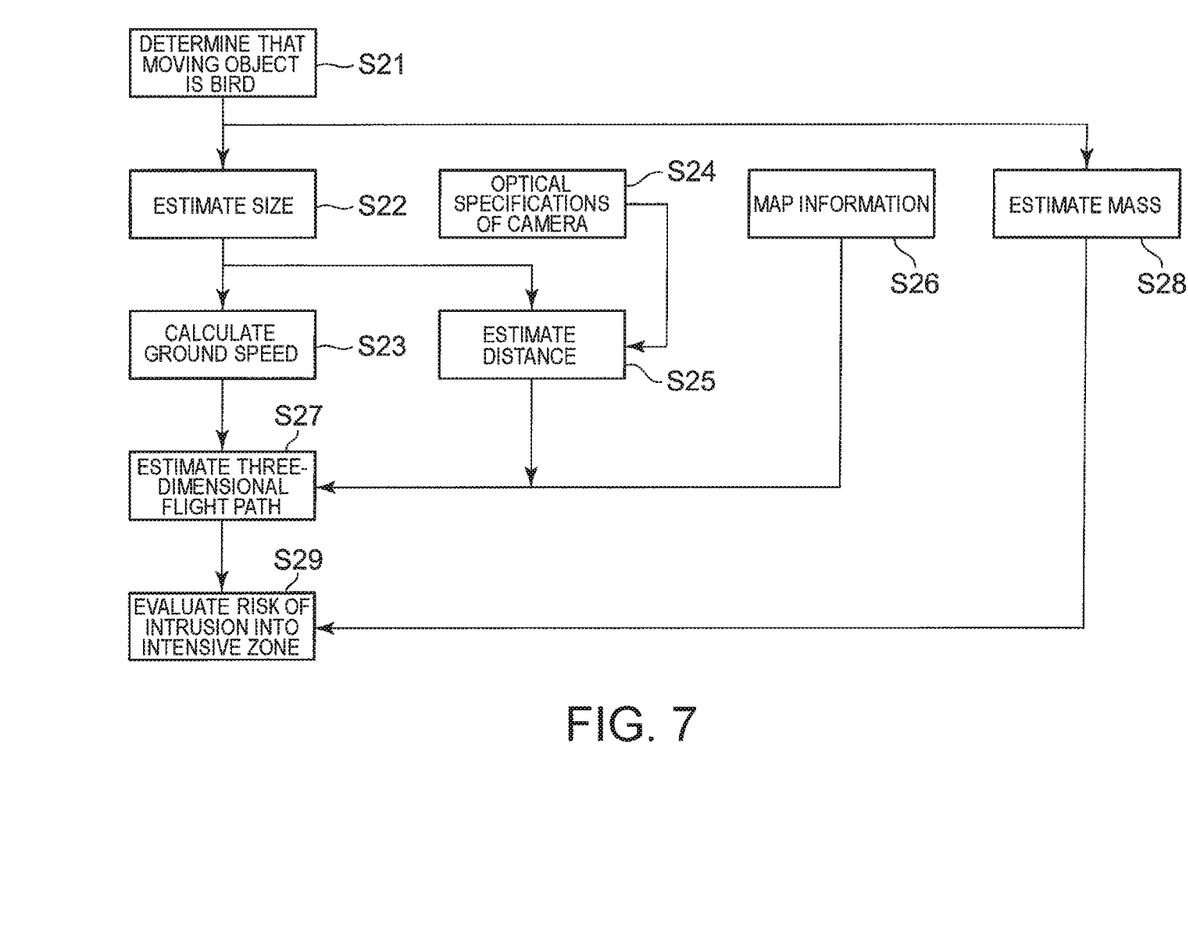
FIG. 7 is a diagram for illustrating the method of detecting a bird by using the object detection system 1.

First, as described above, the object detection/determination unit 7 determines whether or not a bird is included in the images (S21 of FIG. 7) and, when a bird is included in the images, estimates the size of the bird (S22 of FIG. 7).

Next, the flight path estimation unit 17 takes in consideration the estimated size (body length) of the bird, an aerodynamic theory, and data on a local wind velocity separately measured, to thereby calculate a ground speed of the bird (S23 of FIG. 7). Meanwhile, the flight path estimation unit 17 refers to characteristic values of optical specifications (focal length of a camera, dimensions of an image pickup element, etc.) of the image pickup apparatus 3 (S24 of FIG. 7), and based on the size of the bird, the optical specifications, and a relative size of the bird within the images (number of pixels), estimates a distance from the image pickup apparatus 3 to the bird (S25 of FIG. 7), to thereby acquire positional information together with directional information.

Through the above-mentioned processing, the flight path estimation unit 17 acquires bird detection information (size, direction, velocity vector on the images, and detection time of the bird).

Further, the flight path estimation unit 17 refers to the map information 25 recorded in the library 20 (S26 of FIG. 7) and combines the map information with the above-mentioned bird velocity information, positional information, and time information, to thereby record and track a three-dimensional flight path of the bird. Further, based on the three-dimensional flight path information recorded in this step, the flight path estimation unit 17 estimates a three-dimensional flight path at a point in time in the future (S27 of FIG. 7).

Further, a mass of each bird is estimated based on the estimated size of the bird (S28 of FIG. 7), and based on the estimation of the three-dimensional flight path, it is determined whether or not there is a possibility that a bird having a predetermined mass or more intrudes into the zone under intensive surveillance (S29 of FIG. 7).

When it is determined that there is a possibility that a bird having the predetermined mass or more intrudes into the zone under intensive surveillance, as described above, the alarm notification unit 19 issues a warning to the system configured to surveil the zone under intensive surveillance or the person in charge of surveillance of the zone under intensive surveillance.

The operation of the object detection system 1 has been described above.

As described above, according to this exemplary embodiment, the object detection system 1 comprises: the image pickup apparatus 3 configured to pick up a moving object to acquire images of the object; and the object detection apparatus 5 including the object detection/determination unit 7 configured to analyze a period of motion of the object based on the images to estimate the size of the object based on the period of motion of the object.

Accordingly, the size of the moving object may be estimated easily from the images.

In addition, according to this exemplary embodiment, the 3D flight trajectory may be measured based on the images acquired by the single image pickup apparatus 3, which eliminates the need to provide a plurality of image pickup apparatus, and hence reduction in cost and size of the apparatus may be achieved.

INDUSTRIAL APPLICABILITY

In the above, this invention is described by way of the exemplary embodiment, but the exemplary embodiment are merely ones used to describe the invention by giving an example, and are not intended to limit the scope of this invention thereto. It should be understood that a person skilled in the art could arrive at various modification examples and improvement examples based on the above description, and that those modification examples and improvement examples are included in the scope of this invention.

For example, in the exemplary embodiment described above, the case is described where this invention is applied to the bird strike prevention apparatus at an airport or wind power facilities (windmill), but this invention is by no means limited to this case. This invention is applicable to every apparatus required to surveil flying and coming of birds, such as an apparatus for preventing feeding damage at a farm caused by birds or animals.

Further, in the exemplary embodiment described above, the size of a bird is estimated based on the flapping frequency or vertical movement frequency of the bird, but an object whose size is to be estimated is not limited to a bird, and a periodical motion is not limited to the flapping frequency or the vertical movement frequency, either, as long as a periodical motion to be detected can be identified from images. For example, when a period of motion of legs in walking of a human or a period relating to motion of a part of an object is set as the periodical motion, an arbitrary periodical motion of, instead of a bird, a human or an animal, such as a beast, or an arbitrary object set by a user may be set as a periodical motion to be detected. Accordingly, a human may be set as an object to be detected by the object detection apparatus 5, and the object detection apparatus 5 may also be used to detect a human within images acquired by the surveillance camera and to estimate a distance to the human.

Further, in the exemplary embodiment described above, this invention is described by way of the case where only a single image pickup apparatus 3 is used, but through the application of this invention to a 3D measurement apparatus including a plurality of image pickup apparatus, this invention may also be utilized as a fault tolerant function, which is effective in the event of a failure of a part of the image pickup apparatus.

Note that, each of the units of the object detection apparatus 5 may be implemented with the use of a combination of hardware and software. In a mode where hardware and software are used in combination, a program for causing a computer to operate as the object detection apparatus 5 is deployed onto a RAM, and a hardware component, such as a control unit (CPU), is operated based on the program, to thereby cause respective units to operate as various types of components. Further, the program may be recorded onto a recording medium to be distributed. The program recorded onto the recording medium is read into a memory in a wireless or wired manner or via the recording medium itself to cause the control unit or the like to operate. Note that, examples of the recording medium include an optical disc, a magnetic disk, a semiconductor memory device, and a hard disk.

Further, this application is based upon and claims the benefit of priority from Japanese Patent Application No. 2013-191733, filed on Sep. 17, 2013, the disclosure of which is incorporated herein in its entirety by reference.

REFERENCE SIGNS LIST 1 object detection system
3 image pickup apparatus
5 object detection apparatus
7 object detection/determination unit
9 period detection unit
9a flapping detection unit
9b vertical movement detection unit
11 bird size estimation unit
13 image data input processing unit
15 normalized velocity comparison unit
17 flight path estimation unit
19 alarm notification unit
20 library
21 storage unit
21a flapping frequency information
21b vertical movement frequency information
22 operation program
25 map information

The invention claimed is:

1. An object detection apparatus, comprising an object detection/determination unit configured to analyze a period of motion of a moving object, based on moving images acquired by picking up the moving object using an image pickup apparatus, to estimate a size of the moving object based on the period of motion.

2. An object detection apparatus according to claim 1, wherein the object detection/determination unit comprises:
a first period detection unit configured to acquire a flapping frequency of the moving object based on the moving images; and
a size estimation unit configured to estimate the size of the moving object based on the flapping frequency.

3. An object detection apparatus according to claim 1, wherein the object detection/determination unit comprises:
a normalized velocity comparison unit configured to calculate, as a normalized value, a value obtained by normalizing a movement velocity of the moving object to determine, based on the normalized value, whether or not a velocity of the moving object falls within a predetermined velocity range;
a flapping detection unit configured to analyze a flapping frequency of the moving object when the normalized velocity comparison unit determines that the velocity of the moving object falls within the predetermined velocity range; and
a vertical movement detection unit configured to analyze a vertical movement frequency of the moving object when the flapping detection unit fails to detect the flapping frequency.

4. An object detection apparatus according to claim 3, further comprising a flight path estimation unit, which is configured to estimate, based on the moving images, a movement velocity of the moving object and a distance between the moving object and the image pickup apparatus, and to estimate a flight path of the moving object based on the distance, the movement velocity, and the size of the moving object.

5. An object detection apparatus according to claim 4, further comprising an alarm notification unit, which is configured to determine, based on the flight path, whether or not there is a possibility that the moving object intrudes into a zone defined in advance, and to issue a warning when the possibility is found.

6. An object detection apparatus according to claim 3, further comprising a storage unit configured to store flapping frequency information and vertical movement frequency information, the flapping frequency information being information indicative of a relationship between the flapping frequency and the size of the moving object, the vertical movement frequency information being information indicative of a relationship between the vertical movement frequency and the size of the moving object,
wherein the object detection/determination unit is further configured to refer to the flapping frequency information or the vertical movement frequency information to estimate the size of the moving object.

7. An object detection apparatus according to claim 1, wherein the object detection/determination unit is further configured to analyze a period of motion of a leg of a walking animal to estimate the size of the moving object based on the period of motion.

8. A non-transitory computer readable recording medium storing a program for causing a computer to operate as an object detection apparatus, the object detection apparatus comprising an object detection/determination unit configured to analyze a period of motion of a moving object, based on moving images acquired by picking up the moving object using an image pickup apparatus, to estimate a size of the moving object based on the period of motion.

9. An object detection method, comprising detecting a moving object by using an object detection apparatus comprising an object detection/determination unit configured to analyze a period of motion of the moving object, based on moving images acquired by picking up the moving object using an image pickup apparatus, to estimate a size of the moving object based on the period of motion.

10. A bird strike prevention apparatus, comprising the object detection apparatus of claim 5.

11. An object detection system, comprising:
an image pickup apparatus configured to pick up a moving object to acquire moving images of the moving object; and
a detection apparatus comprising an object detection/determination unit configured to analyze a period of motion of the moving object, based on the moving images, to estimate a size of the moving object based on the period of motion.

12. An object detection apparatus, comprising:
a period detection unit configured to acquire a flapping frequency of a moving object based on a plurality of moving images acquired by picking up the moving object using an image pickup apparatus; and
an object size estimation unit configured to estimate a size of the moving object based on the flapping frequency.

* * * * *